(12) United States Patent
Babocichin et al.

(10) Patent No.: US 11,016,954 B1
(45) Date of Patent: May 25, 2021

(54) DISTRIBUTED DATA SET EXTRACTION FOR MIGRATION

(71) Applicant: Amazon Technologies, Inc., Seattle, WA (US)

(72) Inventors: Rostislav Babocichin, Bothell, WA (US); Alexey Gershun, Newton, MA (US); Ilia Gilderman, Bellevue, WA (US); Parker J. Lord, North Reading, MA (US); John MacDonald Winford, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 360 days.

(21) Appl. No.: 15/694,624

(22) Filed: Sep. 1, 2017

(51) Int. Cl.
*G06F 16/21* (2019.01)
*G06F 16/25* (2019.01)

(52) U.S. Cl.
CPC .......... *G06F 16/214* (2019.01); *G06F 16/258* (2019.01)

(58) Field of Classification Search
CPC .............................. G06F 16/214; G06F 16/258
See application file for complete search history.

(56) References Cited

U.S. PATENT DOCUMENTS

| | | | |
|---|---|---|---|
| 6,490,601 B1 | 12/2002 | Markus et al. | |
| 8,312,557 B2 | 11/2012 | Steinberg | |
| 8,782,441 B1 | 7/2014 | Osterwalder et al. | |
| 9,201,606 B1* | 12/2015 | Taylor | G06F 3/0661 |
| 9,270,683 B2 | 2/2016 | Coughlin et al. | |
| 9,298,752 B2 | 3/2016 | Do | |
| 9,400,979 B2 | 7/2016 | Carrott | |
| 9,544,140 B1 | 1/2017 | Bhatia et al. | |
| 9,887,998 B2 | 2/2018 | Paterra et al. | |
| 9,934,389 B2 | 4/2018 | Paterra et al. | |
| 2004/0164149 A1 | 8/2004 | Roberts | |
| 2005/0102522 A1 | 5/2005 | Kanda | |
| 2011/0082811 A1 | 4/2011 | Whitehouse | |
| 2011/0270762 A1 | 11/2011 | Lin | |
| 2012/0151049 A1 | 6/2012 | Carlson | |

(Continued)

OTHER PUBLICATIONS

For Windows: "Windows 7 Bitlocker(TM) Security Policy Windows 7 Bitlocker(TM) Drive Encryptions Security Policy for FIPS 140-2 Validation," Aug. 31, 2011, XP055375244, Retrieved from the Internet: URL:http://csrc.nist.gov/groups/STM/cmvp/documents/140-1/140sp/140sp1332.pdf, pp. 9, paragraph 7—pp. 14.

(Continued)

*Primary Examiner* — Loc Tran
(74) *Attorney, Agent, or Firm* — Robert C. Kowert; Kowert, Hood, Munyon, Rankin & Goetzel, P.C.

(57) ABSTRACT

Distributed extraction of data for migration may be implemented for migrating data sets from a first data store to a second data store. Assignments may be determined for different migration agents to obtain and store the data set in the second data store along with a format for storing the assigned data set portions. The migration agents may then be caused to obtain the assigned portions and store the assigned portions in the second data store according to the identified format. Further operations to request or direct the ingestion of the data set from the second data store may be performed by migration agents with respect to a third data store that performs data ingestion.

18 Claims, 10 Drawing Sheets

(56) References Cited

U.S. PATENT DOCUMENTS

| | | | |
|---|---|---|---|
| 2012/0166576 A1 | 6/2012 | Orsini et al. | |
| 2013/0019095 A1 | 1/2013 | Cohen et al. | |
| 2013/0275744 A1 | 10/2013 | Resch | |
| 2014/0026209 A1 | 1/2014 | Asahara | |
| 2014/0215172 A1* | 7/2014 | Tsirkin | G06F 11/203 711/162 |
| 2015/0007183 A1* | 1/2015 | Luo | G06F 3/0647 718/102 |
| 2015/0019487 A1 | 1/2015 | Buehne et al. | |
| 2015/0019488 A1* | 1/2015 | Higginson | G06F 16/214 707/634 |
| 2015/0353016 A1 | 12/2015 | Calder et al. | |

OTHER PUBLICATIONS

"Chapter 13: Key management Techniques," ED—Menezes A J; Van Oorschot P C; Vanstone S A, Handbook of Applied Cryptography; [CRC Press Series on Discrete Mathematices, and its Applications], CRC Press, Boca Raton, FL, US, pp. 543-590, Oct. 1, 1996, XP001525013 (pp. 551-553).

Amazon, "AWS Import/Export—Developer Guide", Retrieved from http://docs.aws/com/AWSImprtExport/latest/DG/AWSImportExport-dg-pdf, First Published Dec. 9, 2009.

Amazon, "AWS Snowball—User Guide", Retrieved from http://docs.aws.amazon.com/snowball/latest/ug/AWSSnowball-ug.pdf, First Published Oct. 7, 2015.

* cited by examiner

DISTRIBUTED DATA SET EXTRACTION FOR MIGRATION

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by introducing different data stores or data formats that offer different processing or maintenance capabilities. However, introducing multiple data formats is not without cost. Data is often processed by different systems which may not support the current data format of the data. Thus, the ability to perform techniques to move data between data stores that offer different capabilities, locations, or formats is desirable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of distributed data set extraction for migration are described herein. Data migration may be performed in various embodiments in order to move data from a current location to a desired new location. The new location may, for instance, utilize a different storage engine or have different storage capacity (or other hardware capabilities) that make accessing the data more desirable, in some embodiments. Data migration techniques may transform or otherwise modify the data as part of migration, in various embodiments. For example, data stored in a source data store may be stored in a data format (e.g., a file format, schema, etc.) that is different the data format used or supported by the target data store, in some embodiments. Data migration, therefore may convert the data from the format of the source data store to the format of the target data store, in one embodiment.

Figure 1:
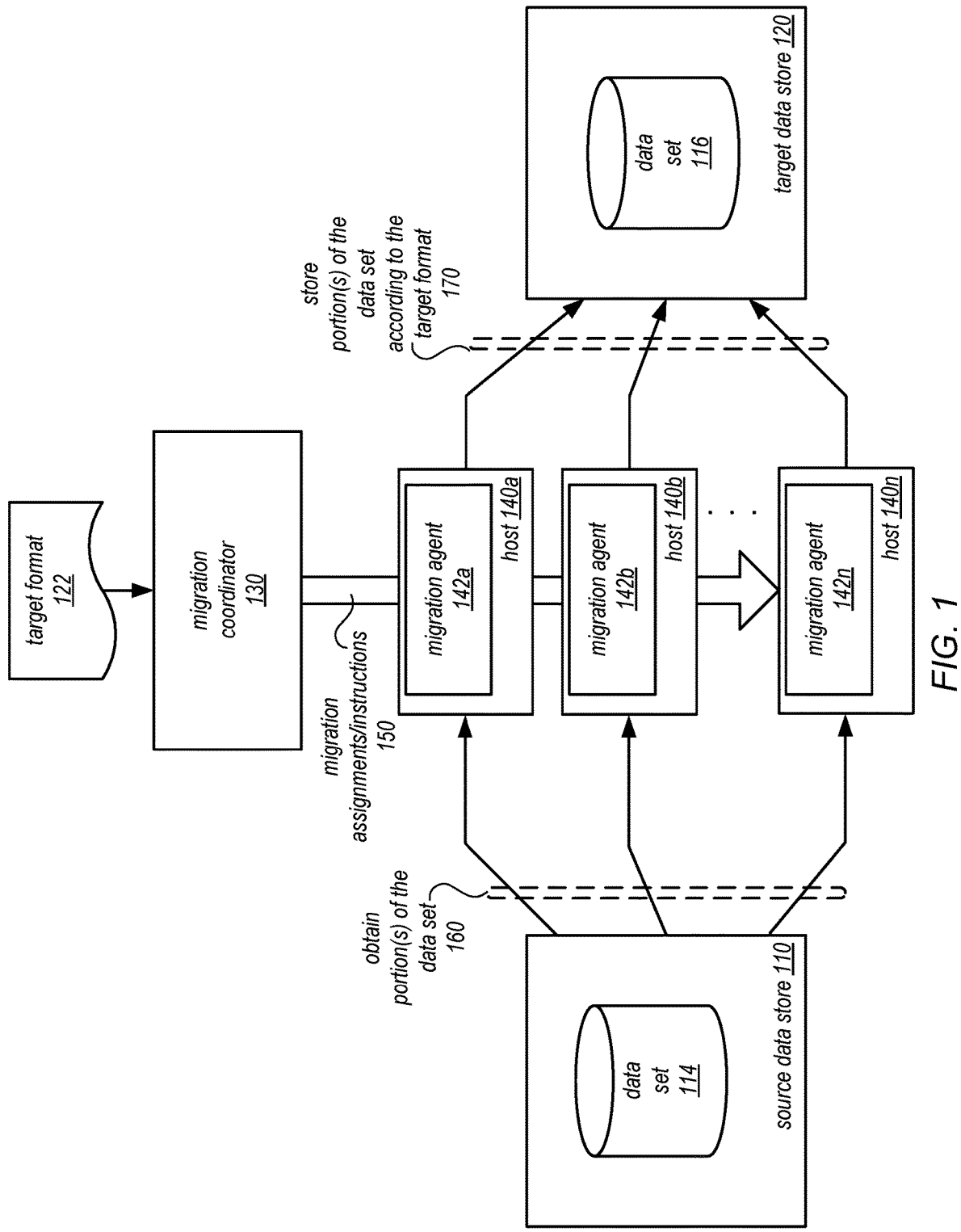
FIG. 1 is a logical block diagram illustrating distributed data set extraction for migration, according to some embodiments.

Because data migrations can move large amounts of data, data migration operations may be costly in terms of resources and time to perform, in some embodiments. The closer devices are that perform operations on data are to the source of the data being migrated, the faster the faster the performance of some migration operations can be performed, in some embodiments. Local extraction techniques, for instance, on devices in a same on-premise network or within a same data center may quickly retrieve data from source data storage. Distributed data extraction for migrating data may leverage the power of local data extraction within a distributed and automated migration environment, in various embodiments. In this way, users do not have manage distributed execution of multiple actors performing migration but can instead specify a migration task that can be executed in a distributed and dynamic fashion, responding to individual migration actor failures without jeopardizing the completion of the migration. FIG. 1 is a logical block diagram illustrating distributed data set extraction for migration, according to some embodiments.

Source data store 110 may store data set 114. Source data store 110 may be various kinds of database system (e.g., relational or non-relational), file system, object store (e.g., a key-value object store), virtualized storage device (e.g., virtual block-based storage devices, such as virtual hard disk drives), or any other data store that may store data set 114. In at least some embodiments, source data store 110 may be a data warehouse or other system that provides online analytical processing (OLAP). In some embodiments, source data store 110 may store data set 114 according to a data format which may be an arrangement, schema, or other manner in which the data is stored at source data store (e.g., logically or physically) that may be compatible with how source data store 110 provides access to the data. If, for instance, source data store 110 is a data warehouse that is compatible with data store in a column-oriented storage format, then the data format may be a column-oriented format in which data set 114 is stored.

Migration of data set 114 may be performed by multiple migration agents, 142*a*, 142*b* through 142*n*, implemented on separate hosts 140*a*, 140*b* through 140*n*, which may be directed and otherwise coordinated by migration coordinator 130 to perform distributed extraction of data set 114 from source data store 110. A migration task may be submitted, created, or otherwise requested to migration coordinator be performed to move data set 114 to a target data store 120. Target data store 120 may also be various kinds of database system (e.g., relational or non-relational), file system, object store (e.g., a key-value object store), virtualized storage device (e.g., virtual block-based storage devices, such as virtual hard disk drives), or any other data store that may store data set 114. Similarly, target data store 120 may implement a same data format (resulting in a homogenous migration) or a different data format (resulting in a heterogeneous migration) that may be a different arrangement, schema, or other manner in which the data is stored at source data store (e.g., logically or physically) that may be compatible with how target data store 120 provides access to the data.

The migration task may include operations to transform the obtained portions for storage in target data store to be a version of the data (or create an exact copy of some or all of data set 114), data set 116, that is stored in target data store 120. Other operations may include filtering, aggregating, dividing, calculating over, appending, or otherwise altering data set 114 as it is stored to target data store 120 in some embodiments. Migration coordinator 130 may determine an execution workflow or plan to perform these migration operations by assigning different portions of data set 114 to different migration agents to extract, transform, and store, in some embodiments. For example, migration coordinator may apply different assignment schemes as discussed below with regard to FIGS. 7 and 8 to divide up portions (e.g., tables, ranges of records, partitions, etc.) of data set 114 amongst migration agents 142 in order to provide a balanced migration workload. Migration coordinator may generate and send instructions 150 to migration agents to obtain the assigned portions of the data set 160 and store portions of the data set 170 according to the target format 122, which may be provided to or discovered by migration coordinator 130, in various embodiments.

Please note that the previous description of distributed data set extraction for migration, according to some embodiments is a logical illustration and thus is not to be construed as limiting as to the architecture for implementing a data store, migration coordinator, or migration agent.

This specification begins with a general description of a provider network that implements data migration service that provides a migration coordinator that can be implemented at user systems to perform distributed extraction for data migration. Then various examples of the migration coordinator and migration agents including different components/modules, or arrangements of components/module that may be employed as part of implementing the migration coordinator and migration agents are discussed. A number of different methods and techniques to implement distributed data set extraction for migration are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
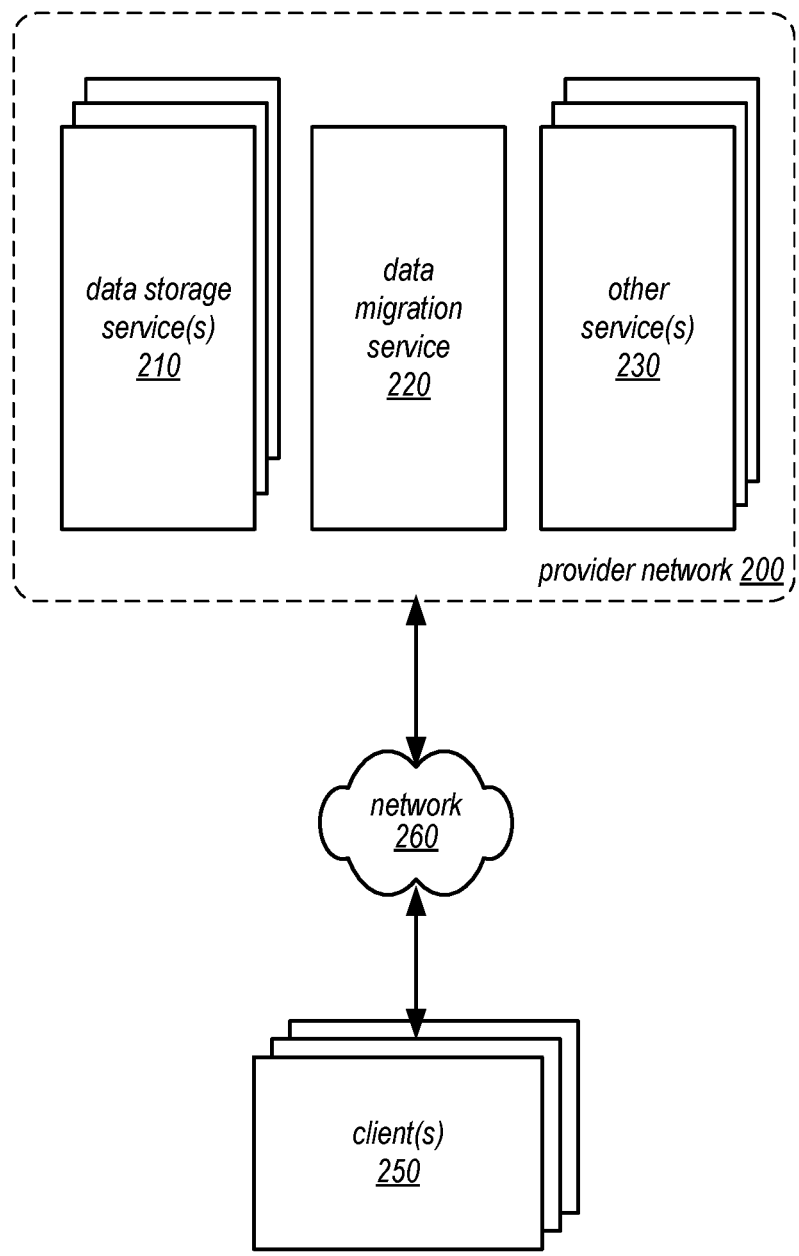
FIG. 2 is a logical block diagram illustrating a provider network offering a data migration service that provides a migration coordinator that implements distributed data set extraction for migration, according to some embodiments.

FIG. 2 is a logical block diagram illustrating a provider network offering a data migration service that provides a migration coordinator that implements distributed data set extraction for migration, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as a data storage service(s) 210 (e.g., database services, object storage services, block-based storage services, or data warehouse storage services), data migration service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIGS. 2-6 may be implemented directly within computer hardware, as instructions directly or indirectly executable by computer hardware (e.g., a microprocessor or computer system), or using a combination of these techniques. For example, the components of FIGS. 2-6 may be implemented by one or more systems system that includes number of computing nodes (or simply, nodes), each of which may be similar to the computer system embodiment illustrated in FIG. 10 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses (e.g., data warehouse service 670 in FIG. 6) for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs), command line interfaces, and/or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (i SCSI).

In some embodiments, data migration service 220 may perform data migrations between data stores. For example, data migration service 220 may provide migration tools, such as migration coordinators to clients and offer data transfer mechanisms, such as shippable storage devices, in various embodiments, as discussed below with regard to FIGS. 3 and 6. For example, data migration service 220 may receive a request to create a shippable storage device migration task may be received. Data migration service 220 may receive the request via an interface and implement device provisioning and dispatching to provision one or more shippable storage devices from a stock of available shippable storage devices. Provisioned shippable storage device (s) may be associated, allocated, or otherwise assigned to a migration task (e.g., according to a migration task identifier), in some embodiments. In some embodiments, the number of shippable storage devices may be recommended or determined for the migration task by data migration service 220 (e.g., based on the size of the data to migrate, the desired speed at which migration is to be performed, cost limitations for performing the migration, etc.). In some embodiments, the number of shippable storage devices may be specified as part of the migration task. Data migration service 220 may set an electronic display of the shippable storage device(s) for shipment to a location so that the shippable storage device may be connected to the source data store. For example, data migration service 220 may set the electronic display (e.g., via a display user interface or via an external connection through the network interface) to display a destination address. In some embodiments, data migration service 220 may also store a return address or the address of another location or facility in memory of the shippable storage device such that the display can be updated with the stored address at some point later in the data transfer device lifecycle.

Data migration service 220 may then direct the shipment of the shippable storage device(s) to a location for connection with the source data store (e.g., by directing agents, automated conveyance systems, or other provider network components to pick-up location for a carrier or shipping service. In some embodiments, the shippable storage device (s) may be shipped as a self-contained shipping container to a destination that is indicated by the devices' electronic display. For example, data migration service 220 may direct that the shippable storage device with the enclosure, the display, the persistent storage and the network interface to a common carrier without any additional packaging or labeling. The carrier may ship the device through a carrier network to the destination without any packaging or labeling in addition to the enclosure and electronic display, in embodiments. In some embodiments, the shippable storage device(s) have no display, and therefore a label and/or packaging may be affixed to the shippable storage devices to display the destination address.

When the shippable storage device(s) are received at the destination address, the device(s) may be installed or otherwise connected to the source data store, in various embodiments. For example, in some embodiments, the shippable storage device(s) may be installed onto a local network at a site (e.g., in a user system 300 in FIGS. 3 and 6) that includes the source data store (e.g., database servers storing the database to be migrated). The data set may be written, copied, or otherwise transferred to the shippable storage device(s), in some embodiments.

Upon completion of the transfer of the version of the data to the shippable storage device(s), the data transfer tool, a user via an interface, or the shippable storage device may update the display to indicate a new destination address that is an ingestion location for provider network 200. For example, the display may be updated with a destination address or code that was stored in memory of the shippable storage device(s) at provisioning or received over a network while in transit or at the location of the source data store. The updated address may be a return address for returning the device to the provider network 200 or an address of another location for the same or different customer (e.g., security provisions may be implemented such that data from multiple customers can be stored on the device, so that the device is shipped to other locations before finally being shipped back to provider network 200). The shippable storage device(s) may then be shipped (e.g., via carrier service) to the ingestion location for the provider network.

Figure 6:
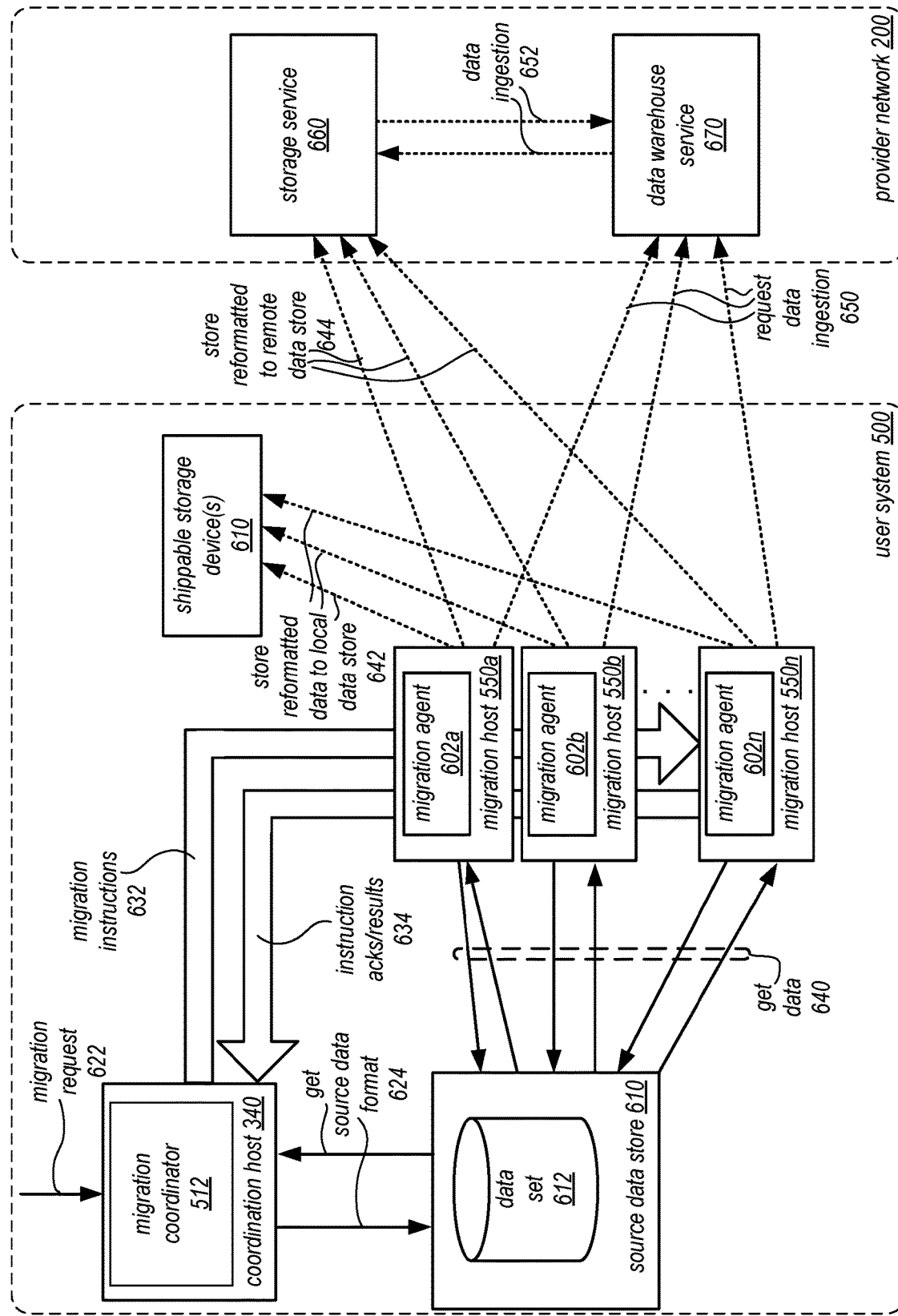
FIG. 6 is a logical block diagram illustrating the coordination and performance of distributed data set extraction for migration at migration agents, according to some embodiments.

Data migration service 220 may implement device receipt and ingestion techniques. For example, data migration service 220 may track the progress of shippable storage device (s) (e.g., via status communications from the shippable storage device(s), in some embodiments. When the shippable storage device(s) are received at the ingestion location, data migration service 220 may direct the connection, upload, transfer or other ingestion of the version of the data. The data may be directly transferred to the target data store, or in some embodiments, stored in another data store (e.g., in another data storage service), so that a target data store may ingest the data, as illustrated in FIG. 6.

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of data migration 220 in order to invoke the execution of a migration task to make data available for processing in a different location or data format for performing various processing operations with respect to data sets stored in data storage service(s) 210.

Generally speaking, clients 250 may encompass any type of client that can submit network-based requests to provider network 200 via network 260, including requests for storage services (e.g., a request to create, read, write, obtain, or modify data in data storage service(s) 210, a request to obtain a migration coordinator, etc.). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
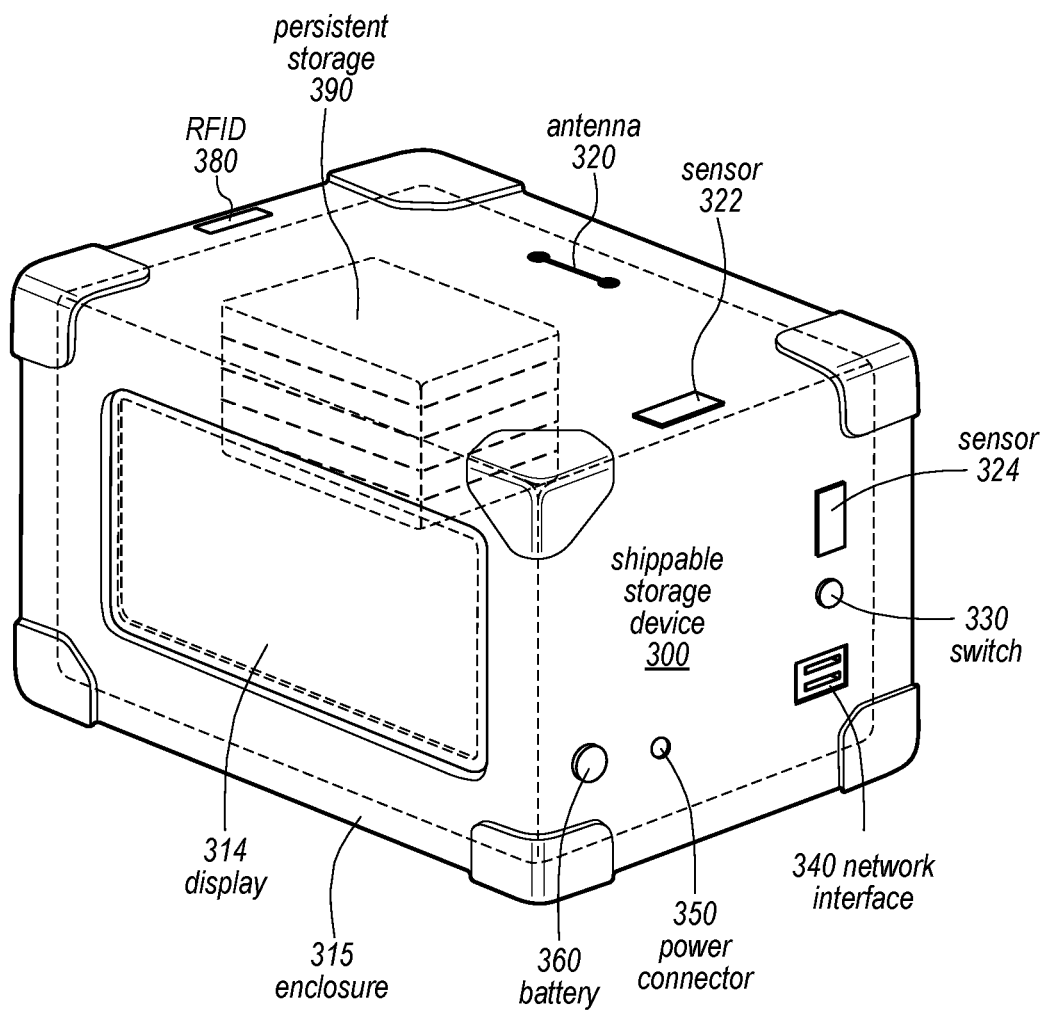
FIG. 3 is an example shippable storage device, according to some embodiments.

FIG. 3 is an example shippable storage device, according to some embodiments. The depicted shippable storage device 300 may be used to move large amounts of customer data off of customer storage networks or servers to other storage networks or servers, when other forms of transfer (e.g., broadband data transmission as may be implemented in an network-based migration) are unavailable, or cost or time prohibitive, for example. Embodiments of the shippable storage device 300 may include more, less, or different features or components than those depicted, in some embodiments.

Shippable storage device 300 may include an enclosure 315 surrounding persistent storage 390. The persistent storage may include any type of storage such as, but not limited to hard disk drives, optical media, magnetic tapes, memristor storage, persistent RAM or solid state storage devices. The enclosure may be ruggedized (e.g., according to various standards, such as military standards or electronics industry standards) and may include an outward-facing electronic display 314 such that when enclosed by the enclosure, the persistent storage, the enclosure, and the electronic display form a self-contained shipping container suitable for shipping without any additional packaging, labeling or the like and such that the electronic display 314 may display a destination location (e.g., in lieu of a shipping label). In some embodiments, the enclosure 315 and the display 314 act as reusable shipping components in lieu of cardboard boxes and shipping labels. The enclosure may include various mechanisms to facilitate movement of the shippable storage device 300, such as rollers, handles or the like.

The shippable storage device 300 is illustrated with battery 360 and power connection 350 for powering some or all of the components of the shippable storage device 300 that require power to function. The power connection 350 may connect the shippable storage device 300 to an external power source, in embodiments. The power connector may power the persistent storage, in some embodiments. Other sources of power are contemplated, such as kinetic energy sources that rely upon the motion during shipping to power the shippable storage device 300, solar energy sources, or the like. Any of various power sources may power the electronics (e.g., the display or the storage) of the shippable storage device 300.

The shippable storage device 300 is depicted with display 314. The display 314 may incorporate any of various display technologies, such as low-power electronic-ink (E-ink), organic light emitting diodes (OLED), active-matrix organic light-emitting diode (AMOLED), flexible displays or touch-sensitive displays as non-limiting examples. Low-power e-ink displays may provide the benefit of reduced power consumption for a shipping environment where small batteries (e.g., batteries that cost less to ship, are less expensive or take up less shipping space) are preferred. The shippable storage device 300 may include multiple displays 314, in some embodiments. For example, some carriers or fulfillment centers label three sides of a shipping container such that the destination of the container can be scanned or read irrespective of the orientation of the container. Similarly, multiple displays can be incorporated into multiple sides of the enclosure 315 of the device. For example, the enclosure may be include 1-6 or more displays, in some embodiments. The various displays may be computer readable (e.g., via scanner), in some embodiments.

The shippable storage device 300 is illustrated with network interface 340. The network interface 340 may act as interface between the shippable storage device 300 and various networks, such as LANS, WANS or the like (e.g., via various protocols, such as iSCSI or Ethernet). In some embodiments, network connection 340 may act as an interface directly to another device (e.g., via SCSI). In some instances, the network interface 340 may include two or more different types of interfaces (e.g., RJ45, SFP, optical).

The shippable storage device 300 is illustrated with switch 330. The switch 330 may act as an on-off power switch or as a switch to activate the display, in some embodiments. Device 300 is also illustrated with antenna 320. The antenna may facilitate wireless communication between the service provider or customer and the device. For example, the wireless communication may be over various cellular networks, Wi-Fi, or the like (e.g., network 106). For instance, the service provider may send updated address information to the shippable storage device 300 via cellular networks while the shippable storage device 300 is en route to some location. The updated address information may be displayed via the display 314 such that the shippable storage device 300 is rerouted on the fly, for example. In other embodiments, the wireless communication channel may be used to send updated shipping information for display while the device is located at the customer site. In embodiments, cellular networks may be used to track the device.

The shippable storage device 300 is illustrated with radio frequency identification (RFID) 380. The RFID may assist with tracking the device, in some instances. For example, devices may be identified during the provisioning process via a respective RFID or devices may be identified upon receipt at the customer or upon return to the service provider by a respective RFID. The RFID may be used to track the shippable storage device 300 as the device is routed through a facility, such as through a provider network fulfillment facility (e.g., while routed on a conveyor system).

The shippable storage device 300 is illustrated with various sensors 322, 324. The device may be outfitted with any of various sensors including a global positioning sensor (GPS), a temperature sensor, a humidity sensor or an accelerometer, all as non-limiting examples. Data may be collected from the sensors and used in various manners, such as to record the environment of the device (e.g., hot, cold, moderate, moist) or record various events associated with the shippable storage device 300, such as a drop, quick movement, orientation or location of the shippable storage device 300. The sensor data may be stored locally, sent over a network or displayed via display 314.

The shippable storage device 300 may include multiple layers of security. For example, data stored on the device may be encrypted one or more times, with one or more keys. The keys may be determined, stored, controlled or held by various parties and applied at various steps of the illustrated processes. For example, some keys used to encrypt the data stored on the device may be stored separate from the device, while other keys used to encrypt the data on the device may be stored with the device. The encryption keys may be applied in multiple layers, in embodiments.

The shippable storage device 300 may be implemented as one or more other types of network-based device or other electronic devices, such as transient local hardware for example. In an example, non-exhaustive list, device 300 may be implemented as various combinations of cryptographic hardware and software (e.g., as a type 1 cryptographic device), as a storage gateway, as a web service, a firewall, a high-assurance guard, a server, virtual machine image, one or more dongles, a data warehousing solution or database service box, or the like.

Figure 4:
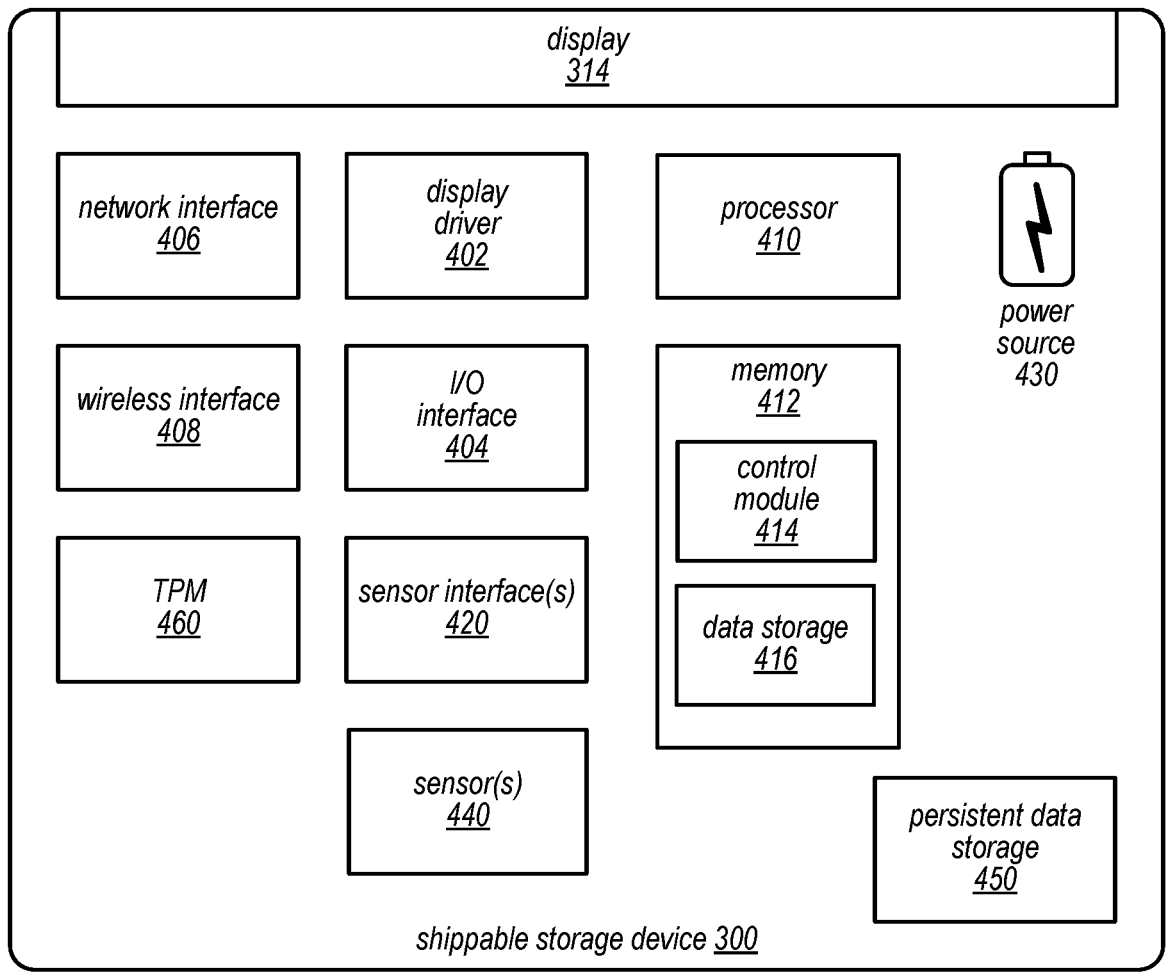
FIG. 4 is a logical block diagram of an example shippable storage device, according to some embodiments.

FIG. 4 is a logical block diagram of a shippable storage device 300, according to some embodiments. FIG. 4 illustrates various components and modules of a shippable storage device 300. The device may include with fewer or additional components or modules. Some component or module may be replaced by other component or modules. For example, the processor 410 and memory 412 may be replaced by firmware, in embodiments.

In FIG. 4, device 300 is illustrated with display 314, network interface 406 and persistent storage 450. In the illustrated embodiment, display driver 402 may provide an interface function between a processor 410 and display 314. For example, to instruct the display to display an address, processor 410 may execute computer instructions from memory 412 that send messages to display driver 402 that are interpreted by the display driver and cause the display driver to display the address on display 314.

Network interface 406 acts as an interface between an external network (e.g., a local network that includes a source data store or a provider network 200) and the device. In embodiments, the network interface may transmit instructions to the device or to transmit encrypted data to the persistent storage 450. Wireless interface 408 may receive (e.g., via cellular or Wi-Fi network) instructions from provider network 200 (e.g., from data migration service 220). For example, data migration service 220 may send updated address information to the shippable storage device 300 via a cellular network such that the displayed address of the device is updated en route, thereby changing the destination for the device in-flight such that the device is shipped to the updated address instead of the prior address.

Input/Output (I/O) interface 404 may coordinate I/O traffic between processor 410, memory 412, the display driver, network interface 406, wireless interface 408, sensor interface(s) 420 and persistent storage 450 or peripheral interface. In some embodiments, I/O interface 404 may perform any necessary protocol, timing or other data transformations to convert data signals from one component (e.g., system memory 412) into a format suitable for use by another component (e.g., processor 410). In some embodiments, I/O interface 404 may include support for devices attached through various types of peripheral buses, such as a variant of the Peripheral Component Interconnect (PCI) bus standard or the Universal Serial Bus (USB) standard, for example. In some embodiments, the function of I/O interface 440 may be split into two or more separate components, such as a north bridge and a south bridge, for example. Also, in some embodiments, some or all of the functionality of I/O interface 404, such as an interface to system memory 412, may be incorporated directly into processor 410.

The shippable storage device 300 is depicted with persistent data storage 450. Persistent data storage 450 may include any combination of non-volatile storage such as hard drives or flash memory. Persistent storage 450 may (e.g., during a provisioning process) store large amounts of encrypted data (e.g., from a large data store such as a customer storage system) during shipment from the customer location to a service provider location where the data is transferred to a service provider storage system.

The shippable storage device 300 is depicted with power source 430 that may power the various electronic components of the shippable storage device 300 and with sensor(s) 440 and sensor interface(s) 420. As described above, any of various sensor(s) may be incorporated into device 300. Device 300 may also include various sensor interface(s) 420 that act as an interface between the sensor(s) 440 and I/O interface 404. The sensor interfaces may be proprietary interfaces, customized for a particular sensor, in embodiments. The sensor interfaces may perform various functions such as conversions of data, analysis of sensor output and output of information based on the analysis or the like.

The shippable storage device 300 is also depicted with a trusted platform module (TPM) 460. The TPM 460 may provide additional security features for the shippable storage device 300. For example, after the storage service provider 102 receives a TPM 460 from a customer, the storage service provider 102 may communicate with the TPM 460 to determine whether a change has been made to the configuration of the shippable storage device 300. Changes to the shippable storage device 300 configuration may indicate that the shippable storage device 300 was tampered with and that a third party may have accessed data on the shippable storage device 300.

Figure 5:
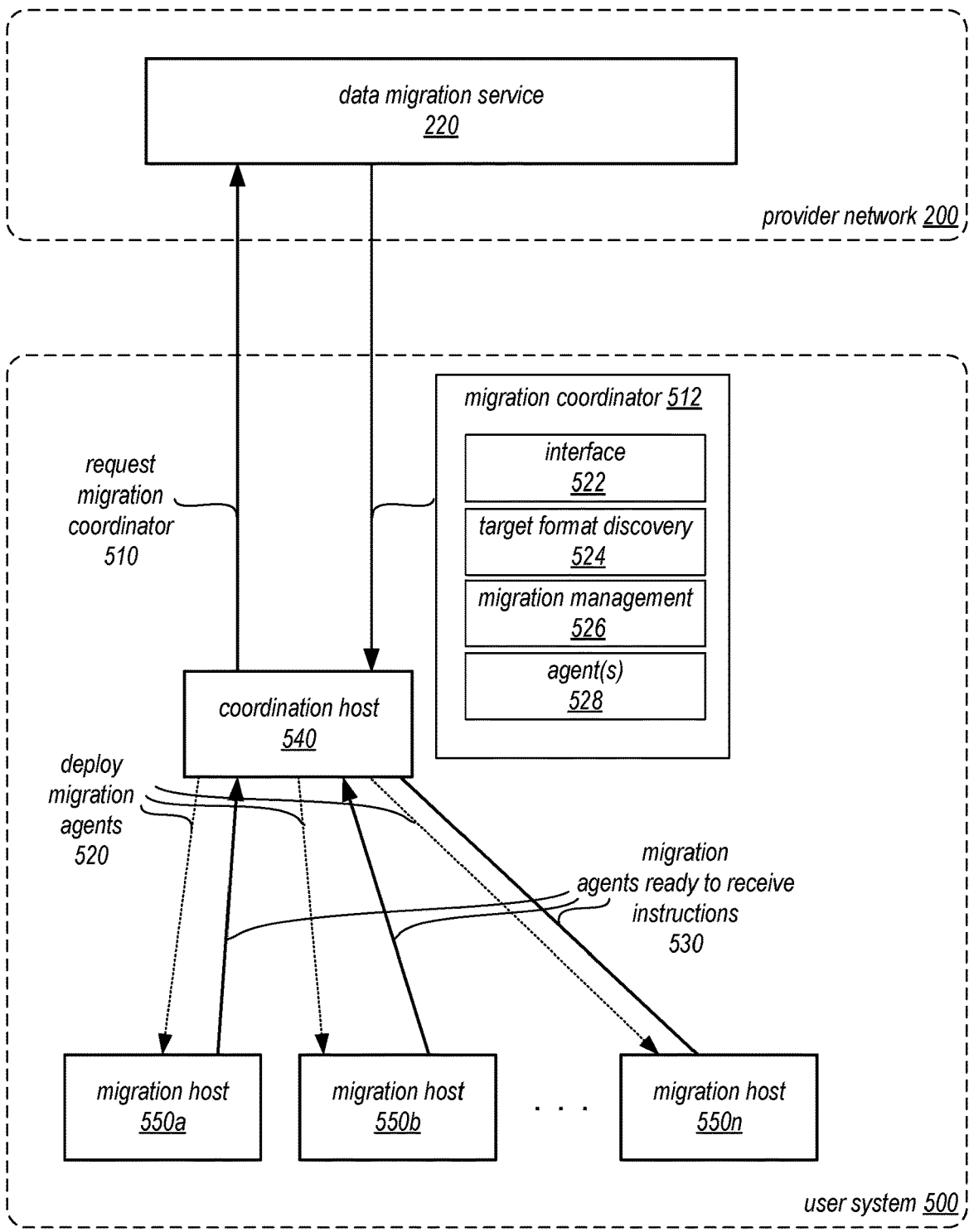
FIG. 5 is a logical block diagram illustrating deployment of a migration coordinator and migration agents that perform distributed data set extraction for migration, according to some embodiments.

FIG. 5 is a logical block diagram illustrating deployment of a migration coordinator and migration agents that perform distributed data set extraction for migration, according to some embodiments. Coordination host 540 as well as migration hosts 550a, 550b, through 550n may be implemented as part of user system 500, which may be external to provider network 200. For example, user system 500 may be a data center, on-premise network or collection of servers, computers, storage devices, networking equipment and other computing resources that may be implemented using computing systems such as computing system 1000 discussed below with regard to FIG. 10.

As noted above, data migration service 220 may provide tools, software, or applications to perform distributed data set extraction for data migration. For example, data migration service may offer migration coordinator 512 which a client may request 510 from data migration service 220 via an interface and download that migration coordinator to a host, such as migration coordination host 540. The request for migration coordinator 501 may, in some embodiments, be submitted programmatically according to a programmatic interface or via a graphical user interface. Although illustrated as the coordination host 540 performing request 510, other client systems or devices could make the request to data migration service 220 and target coordination host 540 as the recipient of migration coordinator 512.

Migration coordinator 512 may be installed, executed, or launched on coordination host 540 in some embodiments. Migration coordinator 512 may include various features, components, or applications, such as interface 522, target format discovery 524, mitigation management 526, and agent(s) 528. Interface 522, in some embodiments, may be implemented as graphical or other user interface that allows a user to request, configure, monitor, abort, modify, or receive results from migrations coordinated and performed using agents 528 installed, launched, or provisioned at other migration hosts 550. Interface 522 may allow a user to identify migration hosts 550, send an installation file, executable, or other information to a migration host 550 in order to install, launch, provision, or otherwise deploy 520 the agent(s) 528 at migration hosts 550. In some embodiments, interface 522 may allow a user to provide access credentials for source, target, or other data stores that may serve as intermediate stores for data sets that are migrated by agent(s) 528. Although not illustrated in FIG. 5, in some embodiments, agents 528 may be manually copied from coordination host to migration hosts and deployed. In some embodiments, deployed migration agents 528 may report, indicate, or otherwise register 530 with coordination host 540 to information migration management 526 that the migration agents 528 are ready to receive instructions to perform a migration. In some embodiments, migration coordinator 512 may scan for or request new migration hosts 550 (e.g., in the event of failure or in order to increase the performance of migration), by providing an indicator a user, performing sweeps of networked computing devices to see if an additional migration agent 528 is listening for instructions, and so on.

Migration coordinator 512 may implement target format discovery 524 in some embodiments. Target format discovery 524 may communicate with a target data store, source data store, or other metadata sources to determine the schema or organization of the data, such as the logical organization of the data (e.g., the number of columns, data types for columns, and names of columns in a table) and/or the physical organization of the data (e.g., the layout of data in physical storage, such as row-oriented storage or column-oriented storage), the configuration of the target data store (e.g., number of storage nodes, partitioning scheme, sorting scheme, etc.), and any other information to perform the migration. In some embodiments target format discovery 524 may implemented automated schema recognition and mapping techniques using knowledge bases that identify supported schema features for different types of source and target data stores, while in other embodiments, target format discovery may locate or receive the input of the schema or mapping information (e.g., submitted by a user or another tool or component) along with other format information. Target format discovery 524 may provide an identified format to migration management 526, in some embodiments.

As discussed in more detail below with regard to FIGS. 6-9, migration management 526 may generate a workflow or other execution plan to perform migrations, monitor and direct the performance of migration agents in execution of the plan (e.g., including generating and sending instructions or otherwise programming the migration agents 528 to perform various operations according to assigned portions of a data set to be migrated). Migration management 526 may handle migration agent failures and other reassignment events, as discussed below with regard to FIG. 9, by, for example, reassigning the portions of a data set to migrate in the event of a migration agent failure or a migration agent being added to the number of migration agents performing a migration, in various embodiments.

FIG. 6 is a logical block diagram illustrating the coordination and performance of distributed data set extraction for migration at migration agents, according to some embodiments. Migration coordinator 512 at coordination host 540 may receive a migration request 622, in some embodiments, to migrate data set 612 from source data store 610 to a target data store. The migration request 622 may create a migration operation or task, in some embodiments. The request 622 may identify the location of the target data store, the configuration of the target data store, or other information that may be used to identify or determine the target data store. In some embodiments, the migration request may trigger target format discovery techniques, such as those discussed above with regard to FIG. 5, in which migration coordinator 512 may get source data format 624 from source data store 610 storing data set 612 in order to determine schema mappings or other operations that may be performed to change the data stored as part of data set to match or satisfy the capabilities or configuration of the target data store.

Migration coordinator 512 may assign different portions of data set 612 according to various assignment schemes, as discussed below with regard to FIGS. 5 and 6. For example, migration coordinator 512 may assign equal (or nearly equal) sized ranges of key values to migration agents 602 in order to identify which portion of data set 612 to obtain. Migration coordinator 512 may generate and send migration instructions 632 (e.g., according to a migration plan determined by migration management 526) to the different migration hosts 550a to 550n on which are deployed migration agents, 602a, 620b, through 602n. For example, migration instructions 632 may include the assigned portion (e.g., the key value ranges) for each migration agent to obtain. Migration agents 602 may perform access requests (e.g., via drivers or other interfaces that can communicate with source data store 610) to obtain or get 640 the assigned portion of data set 612. For example, a migration agent 602 may perform various copy commands, spool commands, other commands that query and store returned results in a different location may be performed to obtain 640 the assigned portion of the data set.

Migration instructions may describe the desired format (or operations to achieve the desired format of the data set) and location in which the obtained portion of the data set is to be stored. For example, migration operations may convert, truncate, modify, reformat, divide, combine, filter, or calculate new values based on existing values. Other migration operations may be performed to changing the storage format of the assigned portion of the data set (e.g., the physical arrangement of data to satisfy the identified format of the target data store even if the schema between the two data stores is the same) and/or compressing or encrypting the portion according to various encryption or compression techniques, in some embodiments. Instructions may also include a storage location for the second data store, credentials for accessing the second data store, whether stored data is to be written into one or multiple files, objects, volumes, etc., and any other storage information for the data set.

In at least some embodiments, different data stores may not be the final destination for the data set. Further movement of the data set may be performed to reach a target or desired destination of the data set. For example, in some embodiments, data set 612 may be a data warehouse to be migrated to data warehouse service 670. Intermediate data stores may be accessed and written to by migration agents 602 to migrate the data to a location that can be later accessed by data warehouse service 670 to ingest data set 612. For example, shippable storage device(s) 610, as discussed above with regard to FIG. 2, may be provided to user system 500, connected to a network or otherwise made accessible to migration hosts 550 (and thus agents 602). Migration instructions 632 may identify the shippable storage devices as the data store to which the obtained portions of the data set are to be stored 642. After migration of the data set to shippable storage device(s) 610, shippable storage device(s) 610 may be shipped back to provider network 200, uploaded or ingested, and moved to another storage location, like storage service 660 and/or data warehouse service 670, in some embodiments.

Migration instructions 632 may also include various keys, passwords, tokens, identities, roles, users, or other permissions that can be utilized or obtained to obtain data 640 and store data (e.g., 642 or 644). For example, migration agents 602 may need more than one access credential or token in order to access storage service 660 to store reformatted data. In some embodiments, the provided instructions may include encryption keys in order to perform symmetric or asymmetric encryption techniques. In at least some embodiments migration instructions 632 may provide migration agents sufficient information that migration agents may obtain and store data autonomously with regard to migration coordinator 512 or other migration agents 602.

In another example, migration agents 602 may perform over network communications (e.g., via an API or other interface for storage service 660) to store 644 or move the reformatted portions to a remote data store, such as storage service 660. Migration agents 602 may receive further instructions to direct the ingestion of the data from storage service 660 to a target cluster, storage nodes, storage hosts, or other resources allocated to or reserved for the data set in data warehouse service 670. For example, migration agents 602 may send requests 650 to perform data ingestion to data warehouse service 670 formatted according to API commands or requests for data warehouse service that identify a location of the reformatted data in storage service 660 which may be ingested into data warehouse service 670. In response to these requests, data warehouse service 670 may perform one access requests to retrieve and ingest 652 the data set from storage service 660. For example, a cluster of storage nodes in the data ware house may have been provisioned to store the data set and formatted according to a desired schema for the data set. The ingestion operation may obtain the data set and store the data set amongst the storage nodes according to the desired schema. Because the data set may already be stored in the desired schema, the ingestion process for data warehouse service may be optimized. In some embodiments, the data set may be stored in files, objects, or locations that correspond to individual storage nodes so that ingestion may be reduced to performing a copy or physical transfer of the data object from a location in storage service 660 to the respective storage nodes in data warehouse service 670.

Figure 7:
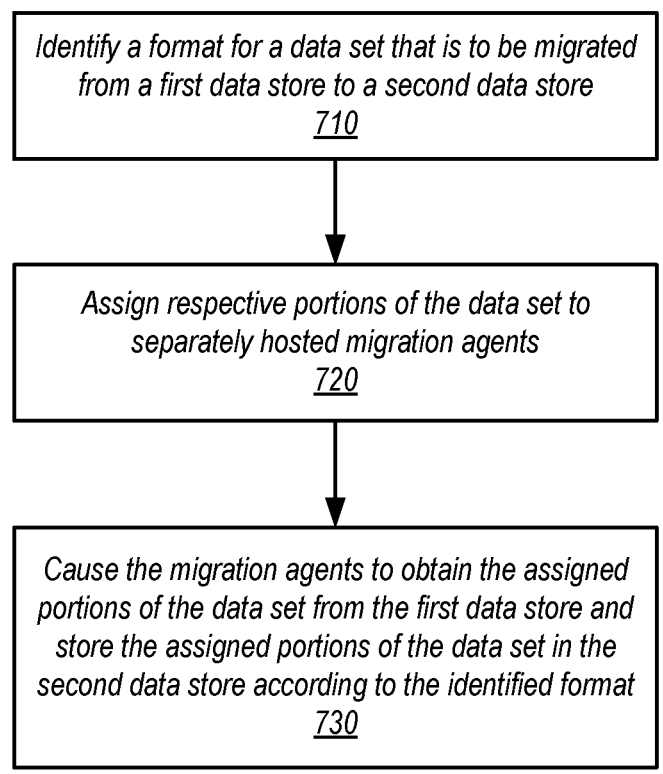
FIG. 7 is a high-level flowchart illustrating methods and techniques to implement distributed data set extraction for migration, according to some embodiments.

Although FIGS. 2-6 have been described and illustrated in the context of a migration coordinator that is separate from the migration agents performing distributed extraction, the various techniques and components illustrated and described in FIGS. 2-6 may be easily applied to other data access or management systems in different embodiments that may facilitate data migration operations, such as data stores or other services that offer extract transform load (ETL) processing operations that may make use of distributed extraction. For example, migration coordination may be implemented as part of a same host implementing a migration agent or as part of a data store that has a built-in migration feature for coordinating the extraction of data sets stored as part of the data store to another data store. As such, FIGS. 2-6 are not intended to be limiting as to other embodiments of a system that may implement migration task validation before data migration. FIG. 7 is a high-level flowchart illustrating methods and techniques to implement distributed data set extraction for migration, according to some embodiments. Various different systems and devices may implement the various methods and techniques described below, either singly or working together. For example, a migration coordinator and migration agents such as described above with regard to FIGS. 2-6 may implement the various methods. Alternatively, a combination of different systems and devices, such as a storage subsystem that manages access to data stored in directly attached storage devices may migrate data to another data store using distributed migration agents as described in the below techniques. Therefore, the above examples and or any other systems or devices referenced as performing the illustrated method, are not intended to be limiting as to other different components, modules, systems, or configurations of systems and devices.

As indicated at 710, a format for a data set that is to be migrated from a first data store to a second data store may be identified, in some embodiments. A format for migrating the data set may include the schema or organization of the data, such as the logical organization of the data (e.g., the number of columns, data types for columns, and names of columns in a table) and/or the physical organization of the data (e.g., the layout of data in physical storage, such as row-oriented storage or column-oriented storage), in some embodiments. The identified format may, in some embodiments, include the configuration of the target data store. For example, if the target data store is a data warehouse cluster that distributes the data set amongst multiple nodes for storing and/or processing access requests to the data set, then the identified format may include the number of storage nodes, the distribution scheme for identifying which node stores or processes access to which rows in table (e.g., a hashing scheme to distribute rows evenly across the different storage nodes), a sortation order or for items within storage devices on a storage node (e.g., a sort key), and so on.

Figure 8:
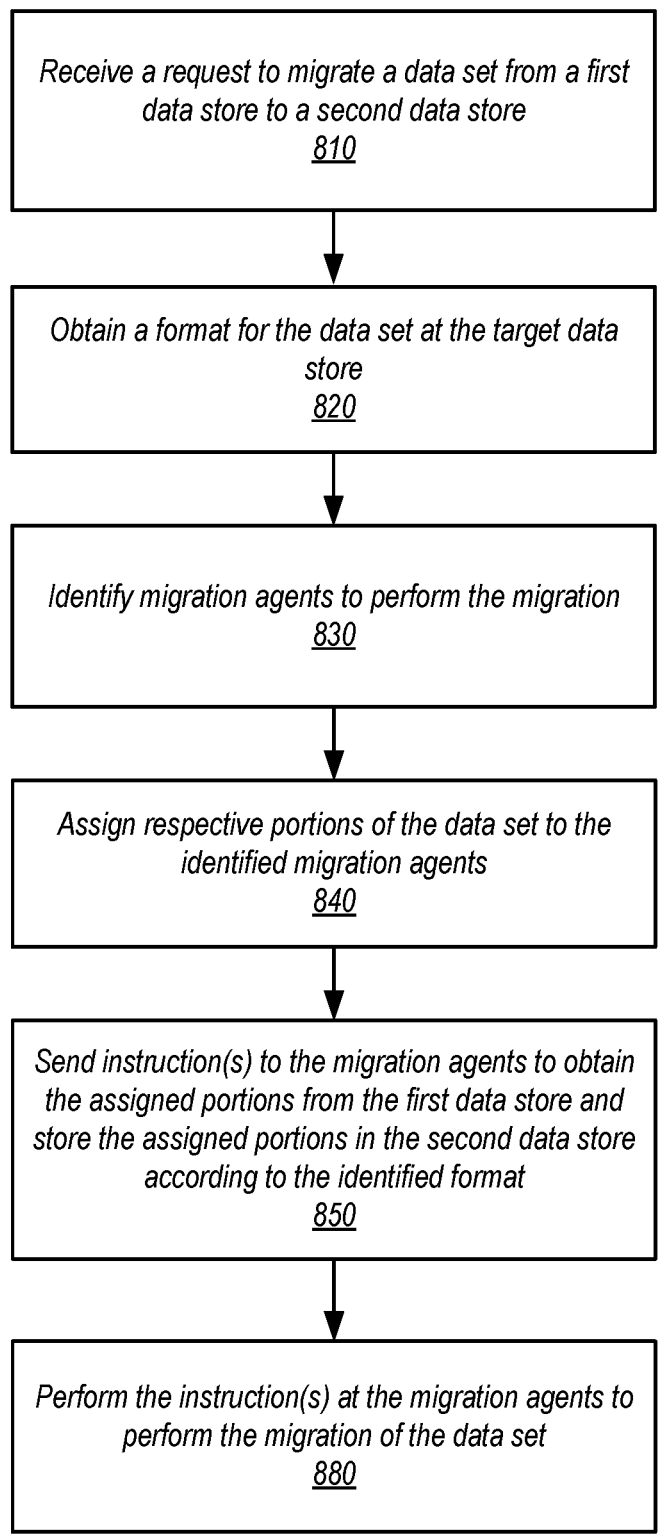
FIG. 8 is a high-level flowchart illustrating methods and techniques to implement assigning and instruction migration agents to perform distributed data set extraction, according to some embodiments.

Identification of the format may include receiving the format or format information as part of a request to perform the migration, as discussed below with regard to FIG. 8. In some embodiments, identifying the format for a data set may be performed by evaluating a source format for the data set at the first data store, a desired or existing format for the data set at the second data store, and determining mappings or other operations to modify or otherwise put data into the identified format. For example, the data types of the columns of a table in the data set may be compared with a list of supported data types for the second data store to determine whether the columns are supported (and if not what would be a conversion or replacement operation to map the data from the column into a column at the second data store). Similarly, identification of the format may include determining the configuration of the second data store (e.g., which may be specified in a request to perform migration or by sending a query to the second data store to describe the second data store, which may return configuration information for the second data store), in some embodiments.

As indicated at 720, respective portions of the data set may be assigned to separately hosted migration agents, in various embodiments. Migration agents, as discussed above with regard to FIGS. 5 and 6, may be installed or deployed on separate hosts in order to leverage the performance capabilities (e.g., separate hardware resources) of the hosts to perform migration of the data set in parallel. Migration agents may include or have access to various drivers (e.g., Java Database Connectivity (JDBC) or Open Database Connectivity (ODBC)) which can be used to access the first data store in order to obtain portions of the data set for migration, in some embodiments. Migration agents may be programmable or otherwise configurable to perform identified operations to obtain, transform, and store data from a data set stored on a first data store to a second data store in order to perform a migration, in some embodiments.

Different assignment schemes may be implemented to take advantage of distributed, parallelized extraction of data from a data set, modification, reformatting, or other operations performed upon the extracted data, and storage of the data in a desired location to complete the migration. Different assignment schemes may be implemented. For example, in some embodiments, assignment schemes may evenly distribute or balance the work to migrate a data set by identifying partitions, ranges, or other items, objects, records, etc. within the data set as the respective portion of the data set. For example, the number of records may be divided into the number of migration agents in order to provide a similar number of records that are being migrated by each migration agent. In some embodiments, logical or physical divisions of the data set (e.g., tables or other data structures, or data volume partitions) may be divided or assigned to different migration agents in another type of assignment scheme (e.g., by dividing the number of partitions or tables into the number of migration agents to assign equal numbers of partitions or tables to migration agents). In some embodiments, migration agents may have different underlying hardware or migration capabilities depending on the host implementing the migration agent. The assignment scheme may balance or distribute the assigned portions of the data set according to the capabilities of the migration agents so that each migration agent is utilized in balanced fashion (even if the size of the portions of the data may be different), in some embodiments.

As indicated at 730, the migration agents may be caused to obtain the assigned portions of the data set from the first data store and store the assigned portions of the data set in the second data store according to the identified format. For instance, as discussed below with regard to FIG. 8, various instructions or other commands may be sent to the migration agents from a migration coordinator which may initiate performance of the migration operation according to the assignments and the format identified for the data set. In some embodiments, migration agents may implement an interface which via which the assigned portion of the data set to obtain may be specified (e.g., by providing a range of objects, items, keys, records, table names, partition identifiers, etc.). The interface may, in some embodiments, may also receive information describing the format (e.g., schema mappings, second data store or other target data store configuration, etc.). Based on the received schema and assigned portion via the interface, the migration agent (instead of a migration coordinator) may identify and/or generate a plan to perform the migration of the assigned portion, in some embodiments. Migration agents may provide updates or status information to a migration coordinator or monitoring component, as discussed below with regard to FIG. 9, in some embodiments.

In at least some embodiments, migration of the data set may be performed in stages along with other operations, such as ingestion requests as discussed above with regard to FIG. 6. For example, the migration agents may be caused to migrate an assigned portion, and request ingestion of the stored portion before retrieving another assigned portion, storing the other assigned portion, and requesting the ingestion of the other portion. In this way, migration may be staged so as not to overwhelm to exceed storage capacities at a data store or ingestion capabilities, in some embodiments.

Distributed extraction from data sets for migration may be implemented by determining and sending instructions to migration agents, as noted above. In this way, migration agents can be adapted to perform different migrations for different data sets in and/or to different formats. FIG. 8 is a high-level flowchart illustrating methods and techniques to implement assigning and instruction migration agents to perform distributed data set extraction, according to some embodiments.

As indicated at 810, a request to migrate a data set from a first data store to a second data store may be received, in various embodiments. For example, a programmatic interface, graphical user interface, or other interface (e.g., a command line interface) may be implemented via which a migration requests may be received. The request may include various information such as the location of a source data store (first data store), a target data store (second data store or other data store), a modifications, operations, or other changes to be made to the data set during migration, a location or specification of the format for the data set to be stored in at the second data store (e.g., a format for a target data store), credentials or other information to access the different data stores, and/or any other information that may be needed to perform or specify the operation of the migration, in some embodiments.

A format for the data set at the target data store may be obtained, as indicated at 820, in various embodiments. For example, the request to migrate the data may include or indicate a location of a data structure, file, or other information that provides a schema or other mapping information that maps the data set from the first data store to the second data store. In some embodiments, the request may trigger the determination or analysis to obtain the schema or mapping information, in some embodiments. For example, a migration coordinator may implement target format discovery techniques, as discussed above with regard to FIG. 10. In some embodiments, the format may be provided or determined using external tools or systems (e.g., not implemented on migration coordinator) but which may still be used to as a format for performing the migration of the data set at the migration agents.

As indicated at 830, migration agents to perform the migration may be identified, in some embodiments. For example, as discussed above with regard to FIG. 7, migration agents may register with a migration coordinator or perform other operations to self-identify the migration agent as available or ready to receive instructions for performing a migration. In some embodiments, migration agents may be discovered by pinging a list of previously used migration agents (e.g., by sending requests for availability to different hosts that implement migration agents). In some embodiments, the request may specify the migration agents (or number of migration agents) to perform the migration agent. For example, the migration agents may be identified using network addresses or other identifiers that locate the hosts of the migration agents, in some embodiments.

As indicated at 840, respective portions of the data set may be assigned to the identified migration agents, in some embodiments. Similar to element 720 in FIG. 7, different assignment schemes may be implemented to take advantage of distributed, parallelized extraction of data from a data set, modification, reformatting, or other operations performed upon the extracted data, and storage of the data in a desired location to complete the migration. Different assignment schemes may be implemented. For example, in some embodiments, assignment schemes may evenly distribute or balance the work to migrate a data set by identifying partitions, ranges, or other items, objects, records, etc. within the data set as the respective portion of the data set. For example, the number of records may be divided into the number of migration agents in order to provide a similar number of records that are being migrated by each migration agent. In some embodiments, logical or physical divisions of the data set (e.g., tables or other data structures, or data volume partitions) may be divided or assigned to different migration agents in another type of assignment scheme (e.g., by dividing the number of partitions or tables into the number of migration agents to assign equal numbers of partitions or tables to migration agents). In some embodiments, migration agents may have different underlying hardware or migration capabilities depending on the host implementing the migration agent. The assignment scheme may balance or distribute the assigned portions of the data set according to the capabilities of the migration agents so that each migration agent is utilized in balanced fashion (even if the size of the portions of the data may be different), in some embodiments.

As indicated at 850, instruction(s) to the migration agents to obtain the assigned portions from the first data store and store the assigned portions in the second data store according to the identified format may be sent, in various embodiments. For example, a workflow, mapping structure, or other migration performance plan that is executed to perform the migration may be generated based on the target format and the assignments of the data set to the migrations. Individual instructions sets for different steps in the plan may be generated in some embodiments. For example, extraction instructions, modification instructions, and storage instructions may be separately generated and sent to migration agents according to different steps or stages of a migration workflow (e.g., data retrieval, data modification, data storage, etc.). In some embodiments, an instruction set for a migration operation may describe or indicate all of the operations that the migration agent performs in order to retrieve, transform or modify the data according to the format, and store the data in the second data store. In some embodiments, instructions may be parameters, configuration information, or other data that sets up or programs the performance of a data extractor. In some embodiments, a programmatic interface, language, and or execution platform may be implemented by migration agents to parse instructions (e.g., scripts, code, interpreted code, byte code, etc.) and execute the parsed instructions.

Included in the instructions may be an indication of the assigned portion of the data set to migrate (e.g., a name, location, or other identifier of the items, records, objects, partition, or other structure of data to obtain), in some embodiments. For example, primary key value ranges, or other key value ranges may be provided to specify the portion of the data set assigned to the migration agent. In some embodiments, the instructions may specify the operations to perform in order to change the data to satisfy the identified format (although in homogenous migrations, the identified format may be the same as the source format). For example, operations may identified in the instructions to convert, truncate, modify, reformat, divide, combine, filter, or calculate new values based on existing values. Other modifications may include changing the storage format of the assigned portion of the data set (e.g., the physical arrangement of data to satisfy the identified format of the target data store even if the schema between the two data stores is the same) and/or compressing or encrypting the portion according to various encryption or compression techniques, in some embodiments. Instructions may also include a storage location for the second data store, credentials for accessing the second data store, whether stored data is to be written into one or multiple files, objects, volumes, etc., and any other storage information for the data set.

As indicated at 860, the instructions may be performed at the migration agents to perform the migration of the data set, in various embodiments. For example, instructions may initiate a set up or configuration operation to ready the migration agent to operate according to the instructions and then commence the migration of the assigned portion of the data, application of identified operations to modify the data, and storage of the data at the identified location in the second data store. As noted above, in some embodiments, the migration agents may parse, translate, or otherwise execute the instructions upon an execution platform implemented as part of the migration agent.

Figure 9:
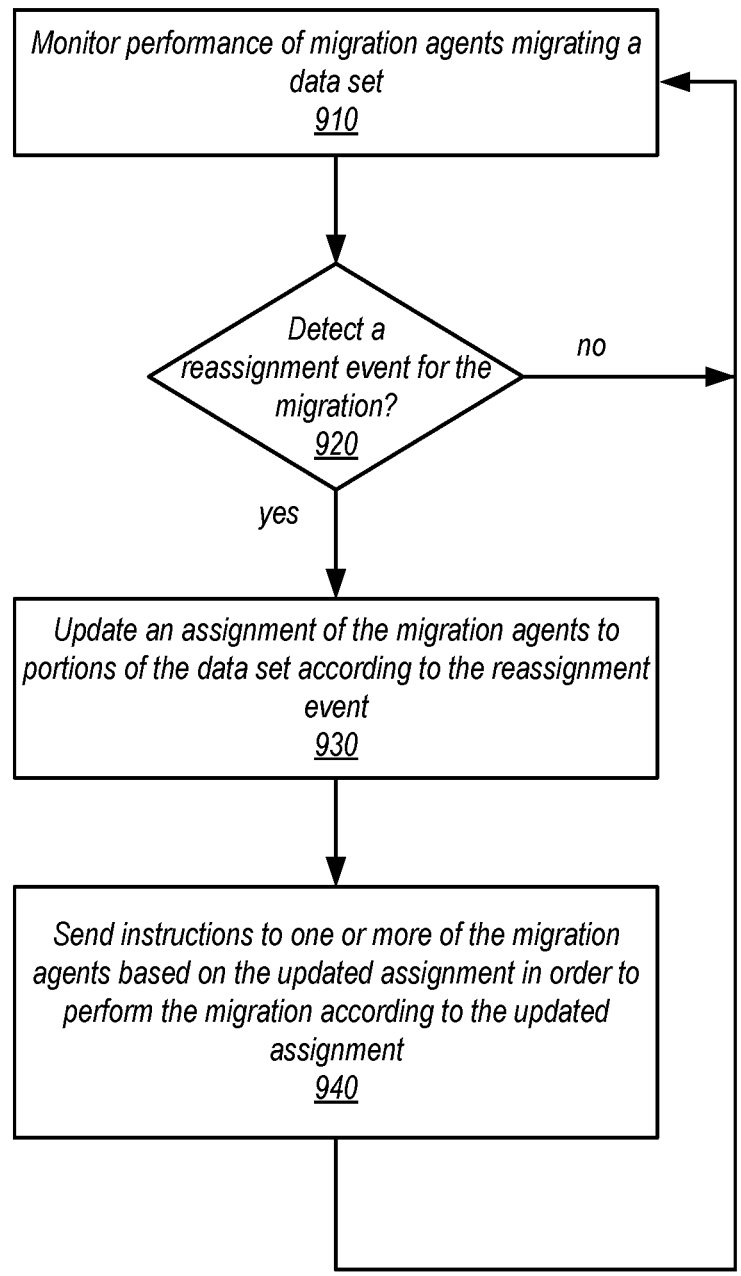
FIG. 9 is a high-level flowchart illustrating methods and techniques to monitor the performance of migration at migration agents for a reassignment event, according to some embodiments.

Distributed extraction of data may introduce a greater possibility of migration failure if a migration agent fails to complete the migration of an assigned portion of a data set, in some embodiments. In order to dynamically respond to failures, or other changes to a distributed extraction of data, monitoring for reassignment events may be implemented in some embodiments to alter, modify, or otherwise change the performance of a migration at migration agents so that migration can continue or improve in light of the changes. FIG. 9 is a high-level flowchart illustrating methods and techniques to monitor the performance of migration at migration agents for a reassignment event, according to some embodiments.

As indicated at 910, performance of migration agent(s) migrating a data set may be monitored, in various embodiments. For example, migration agents may send responses, acknowledgments, heartbeats, or other messages indicating the status of a migration agent to a migration coordinator (or other component that is monitoring migration performance), in one embodiment. The messages may be sent in response to a request for status (e.g., from the monitor according to a pull-based model) or may be automatically sent (e.g., periodically or in response to changes in status of the migration agent according to a push-based model). The performance information may include the status of particular operations (e.g., success or failure for individual reads, writes, modification or transformation operations), utilization metrics for hosts of the migration agents (e.g., processor, I/O, network, or other computing resource utilization), a percentage or other metric indicating the completion of the assigned portion of the data set being migrated by the migration agent (e.g., 70% complete), and/or other performance information (e.g., other migrations being performed for other data sets by the same migration agent or host).

As indicated at 920, the performance of migration agent(s) may be evaluated to determine whether a reassignment event for the migration has occurred, in some embodiments. Various criteria, thresholds, or other conditions may be evaluated based on the performance information that is monitored for the migration. For example, utilization metrics for hosts or agents may be evaluated to determine whether the network utilization of the host for a migration agent exceeds a network utilization threshold, in one embodiment, triggering a reassignment event. Different combinations one or more criteria may be evaluated for different types of reassignment events, in some embodiments. For example, a reassignment event indicating an overworked or "hot" migration agent may be detected when the performance information for the migration indicates that host utilization for the migration agent exceeds utilization thresholds for multiple different resources (e.g., processor, network, and I/O). In one embodiment, a reassignment event may indicate a failed migration agent (e.g., by determining that a heartbeat message or other response/acknowledgment is not received from a migration agent within a time threshold for hearts. In some embodiments, a message or indication identifying a new migration agent (e.g., added to replace a failed migration agent or added to increase the speed or performance of migration) may trigger a reassignment event for the migration. Monitoring may continue as indicated by the negative exit from 920 or upon sending instructions based on the updated assignment so that monitoring is dynamic and responsive to multiple reassignment events that may occur during the performance of a migration, in various embodiments.

As indicated at 930, an update to an assignment of the migration agent to portions of the data set may be performed based on the migration event, in various embodiments. For example, for a reassignment event that adds a migration agent, updates may be made to select sub-portion(s) of those portions currently assigned to other migration agents and reassign migration of the sub-portions to the added migration agent so that a balanced distribution of the data set is migrated from the migration agents. Similarly, for a reassignment event that is triggered as a result of a failure or removal of a migration agent, the portion assigned to the failed/removed migration agent may be divided amongst the remaining migration agents. For reassignment events that account for the performance of a migration agent that is overloaded or "hot" the progress or completion percentage for the different migration agents may be evaluated to select another migration agent that is further along in the completion or progress of its assigned portion to assume migration of part of the portion assigned to the overloaded migration agent, in one embodiment. Update to assignments may be made to a workflow, mapping structure, or other migration performance plan that is executed to perform the migration, in some embodiments.

As indicated at 940, instructions to one or more of the migration agent(s) may be sent based on the updated assignment in order to perform the migration according to the updated assignment, in some embodiments. For example, instructions indicating a new range of key values, object identifiers, addresses, locations, file paths or other information that specifies a portion of a data set to migrate may be provided, in some embodiments. The updated instructions may be sent according to a programmatic interface or other protocol for exchanging information between agents and a migration coordinator, in some embodiments, as discussed above with regard to FIG. 10. Acknowledgment of the instructions may be sent, in some embodiments. If acknowledgment of an instruction is not received, then the instruction may be resent, in some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
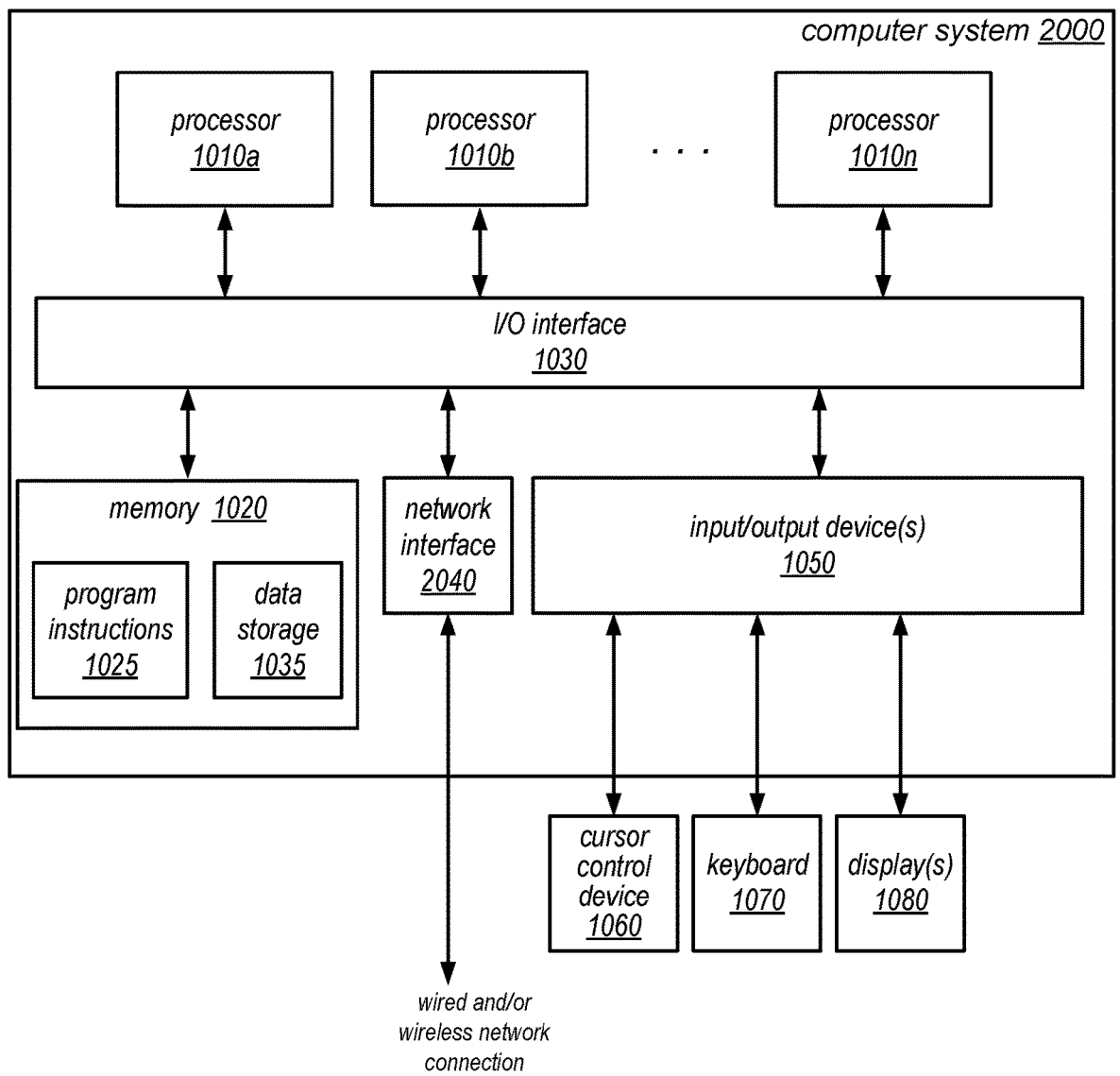
FIG. 10 illustrates an example system that may implement the various methods, techniques, and systems described herein, according to some embodiments.

Embodiments of distributed data set extraction for migration as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a memory to store program instructions which, when performed by at least one processor, cause the at least one processor to perform a method to at least:
        receive, at a migration coordinator, a request to migrate a data set from a first data store to a second data store;
        obtain, by the migration coordinator, a format for the data set;
        identify, by the migration coordinator, migration agents, hosted separately from the migration coordinator, the first data store, and the second data store, to perform the migration;
        assign, by the migration coordinator, different respective portions of the data set to different ones of the separately hosted migration agents;
        send, by the migration coordinator, respective instructions to the separately hosted migration agents to obtain the different respective portions of the data set from the first data store, and store the different respective portions of the data set in the second data store in the obtained format according to the assignment; and
        perform, by the separately hosted migration agents, the respective instructions in order to migrate the different respective portions of the data set from the first data store to the second data store according to the assignment.

2. The system of claim 1, wherein the method further causes the at least one processor to:
    detect, by the migration coordinator, a reassignment event for the migration based, at least in part, on performance information for the migration agents;
    update the assignment of the migration agents to the respective portions of the data set according to the reassignment event; and send additional instructions to one or more of the migration agents based on the updated assignment to perform the migration according to the updated assignment.

3. The system of claim 1, wherein the migration agents store the different respective portions in a remote data store via respective programmatic interface requests and wherein the method further causes the at least one processor to send, by the migration agents, one or more requests to a third data store to ingest the data set from the second data store.

4. The system of claim 3, wherein the migration coordinator and the migration agents are implemented as part of a user system external to a provider network, wherein the remote data store is hosted as part of a storage service of the provider network, and wherein the third data store is a data warehouse service of the provider network.

5. A method, comprising:
 identifying a format for a data set that is to be migrated from a first data store to a second data store;
 identifying migration agents, hosted separately from the first data store and the second data store, to perform the migration,
 assigning different respective portions of the data set to different ones of the migration agents that are hosted separately from the first data store and the second data store; and
 causing the separately hosted migration agents to obtain the different respective portions of the data set from the first data store and store the different respective portions of the data set in the second data store in the identified format according to the assignment.

6. The method of claim 5, wherein the second data store is a remote data store and wherein storing the different respective portions of the data set comprises sending requests to store the different respective portions via respective programmatic interface requests to the remote data store.

7. The method of claim 6, further comprising causing the migration agents to send one or more requests to a third data store to ingest the data set from the remote data store.

8. The method of claim 5, wherein identifying the format comprises obtaining a distribution scheme for storing the data set amongst a plurality of storage nodes.

9. The method of claim 5, wherein the second data store is one or more shippable storage devices.

10. The method of claim 5, wherein storing the different respective portions of the data set includes applying one or more migration operations to modify at least some of the data.

11. The method of claim 5, further comprising:
 detecting a reassignment event for the migration based, at least in part, on performance information for the migration agents;
 updating the assignment of the migration agents to the respective portions of the data set according to the reassignment event; and
 causing one or more of the migration agents to perform the migration according to the updated assignment.

12. The method of claim 11, wherein detecting the reassignment event for the migration comprises detecting a failure of one of the migration agents, wherein the updated assignment assigns the respective portion assigned to the failed migration agent to at least one other of the migration agents.

13. A non-transitory computer-readable storage medium, storing program instructions that when executed by one or more computing devices of a migration coordinator, cause the one or more computing devices to implement:
 obtaining a format for a data set that is to be migrated from a first data store to a second data store;
 identifying migration agents, hosted separately from the migration coordinator, the first data store, and the second data store, to perform the migration;
 assigning different respective portions of the data set to different ones of the migration agents that are hosted separately from the migration coordinator, the first data store, and the second data store; and
 causing the separately hosted migration agents to obtain the different respective portions of the data set from the first data store, and store the different respective portions of the data set in the second data store in the obtained format according to the assignment.

14. The non-transitory computer-readable storage medium of claim 13, wherein the second data store is one or more shippable storage devices.

15. The non-transitory computer-readable storage medium of claim 13, wherein the obtaining, the identifying, the assigning, and the causing are performed to migrate a different data set using at least one of the same migration agents.

16. The non-transitory computer-readable storage medium of claim 13, wherein storing the different respective portions of the data set includes storing the different respective portions of the data set according to a least one:
 compression technique; or
 encryption technique.

17. The non-transitory computer-readable storage medium of claim 13, wherein the program instructions cause the one or more computing devices to further implement:
 detecting a reassignment event for the migration based, at least in part, on performance information for the migration agents;
 updating the assignment of the migration agents to the respective portions of the data set according to the reassignment event; and
 causing one or more of the migration agents to perform the migration according to the updated assignment.

18. The non-transitory computer-readable storage medium of claim 17, wherein, in detecting the reassignment event for the migration, the program instructions cause the one or more computing devices to implement detecting an additional migration agent, wherein the updated assignment assigns at least some of the different respective portions to the additional migration agent.

* * * * *